United States Patent
Izatt (10) Patent No.: US 8,181,237 B2
(45) Date of Patent: May 15, 2012

(54) METHOD FOR IMPROVING SECURITY OF COMPUTER NETWORKS

(75) Inventor: David Izatt, Huntsville, AL (US)

(73) Assignee: Arxceo Corporation, Atlanta, GA (US)

( * ) Notice: Subject to any disclaimer, the term of this patent is extended or adjusted under 35 U.S.C. 154(b) by 0 days.

(21) Appl. No.: 13/034,697

(22) Filed: Feb. 24, 2011

(65) Prior Publication Data

US 2011/0258691 A1    Oct. 20, 2011

Related U.S. Application Data

(63) Continuation of application No. 11/775,214, filed on Jul. 9, 2007, now abandoned.

(60) Provisional application No. 60/806,771, filed on Jul. 8, 2006.

(51) Int. Cl.
*H04L 29/06* (2006.01)
*G06F 11/30* (2006.01)
*G06F 15/16* (2006.01)

(52) U.S. Cl. .................. 726/11; 726/4; 709/245

(58) Field of Classification Search ................ None
See application file for complete search history.

(56) References Cited

U.S. PATENT DOCUMENTS

| | | | |
|---|---|---|---|
| 5,606,668 A | 2/1997 | Shwed | |
| 5,633,858 A | 5/1997 | Chang et al. | |
| 5,896,499 A | 4/1999 | McKelvey | |
| 5,987,611 A | 11/1999 | Freund | |
| 6,098,172 A | 8/2000 | Coss et al. | |
| 6,141,755 A | 10/2000 | Dowd et al. | |
| H1944 H | 2/2001 | Cheswick et al. | |
| 6,311,275 B1 * | 10/2001 | Jin et al. | 726/12 |
| 6,400,707 B1 | 6/2002 | Baum et al. | |
| 6,577,630 B1 | 6/2003 | Markwalter et al. | |
| 6,643,782 B1 * | 11/2003 | Jin et al. | 726/3 |
| 6,654,796 B1 | 11/2003 | Slater et al. | |
| 6,751,738 B2 | 6/2004 | Wesinger et al. | |
| 6,754,831 B2 | 6/2004 | Brownell | |
| 6,823,387 B1 | 11/2004 | Srinivas | |
| 6,823,453 B1 | 11/2004 | Hagerman | |
| 6,826,694 B1 | 11/2004 | Dutta et al. | |
| 6,845,452 B1 * | 1/2005 | Roddy et al. | 726/11 |

(Continued)

OTHER PUBLICATIONS

Catalyst 6500 Series Switch and Cico 7600 Series Router Firewall Services Module Configuration Guide. 2004 Release 2.2. Chapter 1, 1-2.

(Continued)

*Primary Examiner* — Christopher Revak
(74) *Attorney, Agent, or Firm* — Wilson Sonsini Goodrich & Rosati (57) ABSTRACT

A method of preventing unauthorized user access to a computer network has been developed. The method includes receiving a domain name server resolution request at the computer network from a requesting user. Next a reply to the requesting user is generated with a domain name server resolution and internet protocol address of a target device within the computer network. The reply is inspected with a network security device, where the network security device does not have an assigned internet protocol address so that it remains undetected by the requesting user. The network security device then monitors data traffic to the computer network to detect a reply from the requesting user. Once detected, the reply to the internet protocol address is intercepted with the network security device. Finally, the network security device verifies that the requesting user is authorized to access the computer network with the network security device.

7 Claims, 6 Drawing Sheets

U.S. PATENT DOCUMENTS

| | | | |
|---|---|---|---|
| 6,856,991 B1 | 2/2005 | Srivastava | |
| 6,895,433 B1 | 5/2005 | Slater et al. | |
| 6,907,525 B2 * | 6/2005 | Pazi et al. | 713/170 |
| 6,966,004 B1 * | 11/2005 | Jin et al. | 726/5 |
| 6,973,568 B2 | 12/2005 | Hagerman | |
| 7,043,753 B2 * | 5/2006 | Roddy et al. | 726/11 |
| 7,088,718 B1 | 8/2006 | Srivastava | |
| 7,100,201 B2 | 8/2006 | Izatt | |
| 7,114,096 B2 | 9/2006 | Freimuth et al. | |
| 7,140,041 B2 | 11/2006 | Jeffries et al. | |
| 7,143,442 B2 | 11/2006 | Scarfe et al. | |
| 7,188,365 B2 | 3/2007 | Balissat et al. | |
| 7,213,063 B2 | 5/2007 | Bressoud et al. | |
| 7,249,376 B2 | 7/2007 | Wesinger et al. | |
| 7,249,378 B2 | 7/2007 | Wesigner et al. | |
| 7,257,834 B1 * | 8/2007 | Boydstun et al. | 726/1 |
| 7,263,717 B1 * | 8/2007 | Boydstun et al. | 726/4 |
| 7,266,754 B2 | 9/2007 | Shah et al. | |
| 7,269,654 B2 | 9/2007 | Srinivas | |
| 7,281,129 B2 | 10/2007 | Zaborovsky et al. | |
| 7,313,815 B2 * | 12/2007 | Pazi et al. | 726/7 |
| 7,327,746 B1 | 2/2008 | Au et al. | |
| 7,356,587 B2 | 4/2008 | Boulanger et al. | |
| 7,472,414 B2 | 12/2008 | Izatt et al. | |
| 7,543,332 B2 | 6/2009 | Balissat et al. | |
| 7,552,471 B2 * | 6/2009 | Roddy et al. | 726/11 |
| 7,584,301 B1 * | 9/2009 | Joshi | 709/244 |
| 7,840,678 B2 * | 11/2010 | Joshi | 709/226 |
| 7,949,757 B2 * | 5/2011 | Joshi | 709/226 |
| 7,979,694 B2 * | 7/2011 | Touitou et al. | 713/154 |
| 2001/0056492 A1 | 12/2001 | Bressoud et al. | |
| 2002/0103916 A1 | 8/2002 | Chen | |
| 2002/0133586 A1 | 9/2002 | Shanklin et al. | |
| 2003/0070096 A1 * | 4/2003 | Pazi et al. | 713/201 |
| 2003/0079031 A1 | 4/2003 | Nagano | |
| 2003/0110274 A1 | 6/2003 | Pazi | |
| 2003/0135625 A1 | 7/2003 | Fontes et al. | |
| 2003/0145232 A1 | 7/2003 | Poletto | |
| 2004/0088537 A1 * | 5/2004 | Swander et al. | 713/153 |
| 2004/0133798 A1 * | 7/2004 | Swander | 713/200 |
| 2004/0250127 A1 | 12/2004 | Scoredos et al. | |
| 2004/0267874 A1 | 12/2004 | Westberg et al. | |
| 2005/0027872 A1 | 2/2005 | Srinivas | |
| 2005/0039104 A1 | 2/2005 | Shah et al. | |
| 2005/0240989 A1 | 10/2005 | Kim et al. | |
| 2005/0289647 A1 | 12/2005 | Izatt et al. | |
| 2006/0168649 A1 | 7/2006 | Venkat et al. | |
| 2006/0191003 A1 | 8/2006 | Bahk et al. | |
| 2006/0230129 A1 | 10/2006 | Swami et al. | |
| 2006/0239254 A1 * | 10/2006 | Short et al. | 370/352 |
| 2006/0280121 A1 | 12/2006 | Matoba | |
| 2007/0211723 A1 | 9/2007 | Patel et al. | |
| 2008/0101391 A1 | 5/2008 | Au et al. | |
| 2008/0134300 A1 | 6/2008 | Izatt | |
| 2008/0148406 A1 | 6/2008 | Boulanger et al. | |
| 2008/0276294 A1 * | 11/2008 | Brady | 726/1 |
| 2009/0288158 A1 | 11/2009 | Izatt et al. | |

OTHER PUBLICATIONS

Gillespie. Stealth Firewalls. Sans Institute. Apr. 10, 2001.
Matsumoto. Fast Hardware Firewall Runs on NSA Technology. Electronic Engineering Times. Oct. 16, 2000. pp. 59. CMP Media Inc.
Newman. Super Firewalls! Data Communications. May 21, 1999. pp. 50. CMP Media Inc.
No Author. Recourse Releases Man Trap Covert Security Software. Newswire. Oct. 4, 1999. pp. 410.

* cited by examiner

FIG. 1

(Prior Art)

FIG. 2

(Prior Art)

(Prior Art)

METHOD FOR IMPROVING SECURITY OF COMPUTER NETWORKS

CROSS-REFERENCE TO RELATED APPLICATIONS

This application is a continuation of U.S. patent application Ser. No. 11/775,214 filed on Jul. 9, 2007, which is now Abandoned, which claims the benefit of U.S. Provisional Patent Application No. 60/806,771 filed on Jul. 8, 2006, the contents of which applications are all incorporated herein by reference in their entirety.

FIELD OF THE INVENTION

The invention relates generally to computer software. More specifically, the present invention relates to computer software that enhances computer network security for unauthorized intrusion.

BACKGROUND ART

As society's dependence on computers increases, the importance of security for computers and their networks also increases. Threats such as hackers can shut down or damage large computer networks and cost significant amounts of money, resources, and time. Security measures to prevent such incidents are constantly evolving along with the nature and sophistication of the threat.

Figure 1:
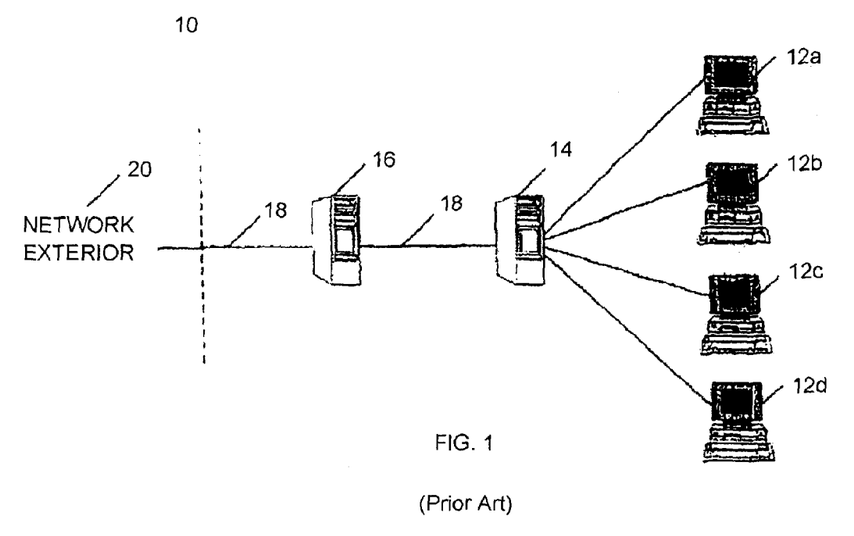
FIG. 1 shows a schematic of a prior art network with a firewall.

One technique to protect a computer network from external threats is by using a "firewall". A firewall is a combination of hardware and software that is placed between a network and its exterior. FIG. 1 shows a schematic of a prior art network 10 with a firewall. The network 10 includes a series of users 12a-12d that are linked and controlled through a server 14. The device could also be a router or a switch for the network. A firewall 16 is installed between the server 14 and the network exterior 20. The server 14, the firewall 16, and the exterior 20 are interconnected through a single The single line 18 prevents outsiders from accessing the network except through the firewall 16. The firewall receives all data from the network exterior before it is sent to the network users. The data may be e-mail, encrypted data, internet queries, or any other type of network traffic. The firewall sorts and analyzes the data and determines whether it should have access to the network. if the data is authorized, the firewall forwards the data on to its destination. If the data is unauthorized, the firewall denies access to the network.

Figure 2:
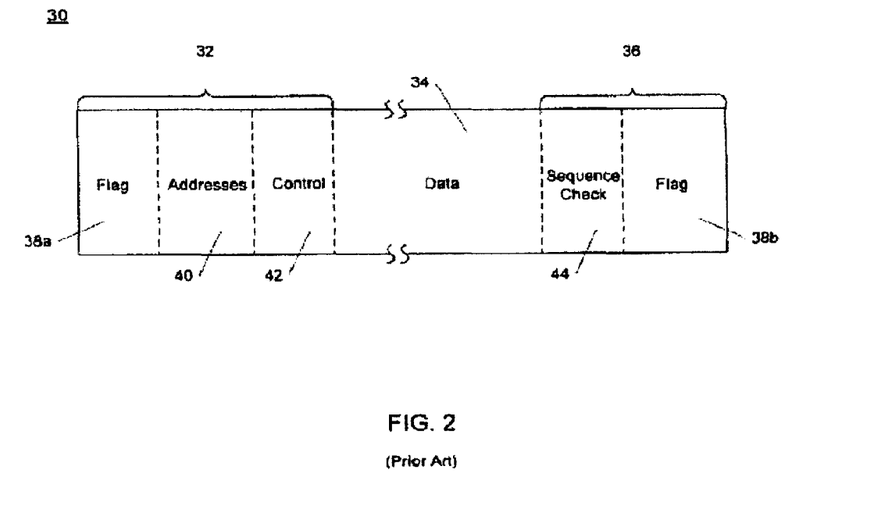
FIG. 2 shows a schematic of a prior art data packet.

Data is normally transmitted in multiple bundles of information called "data packets" or "packets". A message, query, etc. from the outside network is broken down into these packets in order to provide more efficient transmission of the data. Once all packets of data arrive at the destination, the packets are re-assembled. However, the packets contain more information than just the transmitted data. FIG. 2 shows a diagram of a prior art data packet 30. The packet 30 includes three segments: a header 32; a body 34; and a trailer 36. The body 34 is the segment that contains the actual substance of the data.

The header 32 and the trailer 36 both contain various fields that are necessary for the administrative control of the packet 30. The header 32 segment includes: a flag 38a; an address field 40; and a control field 42. The trailer 36 segment includes: a sequence check field 44 and a flag 38b. The first flag 38a signifies the start of the packet 30. A second flag 38b signifies the end of the packet 30. The sequence check field 44 provides a check to ensure the data of the packet was properly received. The address field 40 includes the addresses of the source and the destination of the data. The control field 42 contains various information related to the administration of the packet 30 including a "time-to-live" field. The time-to-live field is an internal countdown mechanism that ensures that undeliverable or lost packets are deleted. The time-to-live field is given a certain value when the packet is first transmitted. As the packet passes through various servers, routers, switches, bridges, gateways, etc. that makes up a network, the time-to-live field is decremented once by each device it passes through. Once the time-to-live field reaches zero, the packet is deleted. This mechanism prevents a lost or undeliverable packet from circulating on the network in an endless loop.

Figure 3:
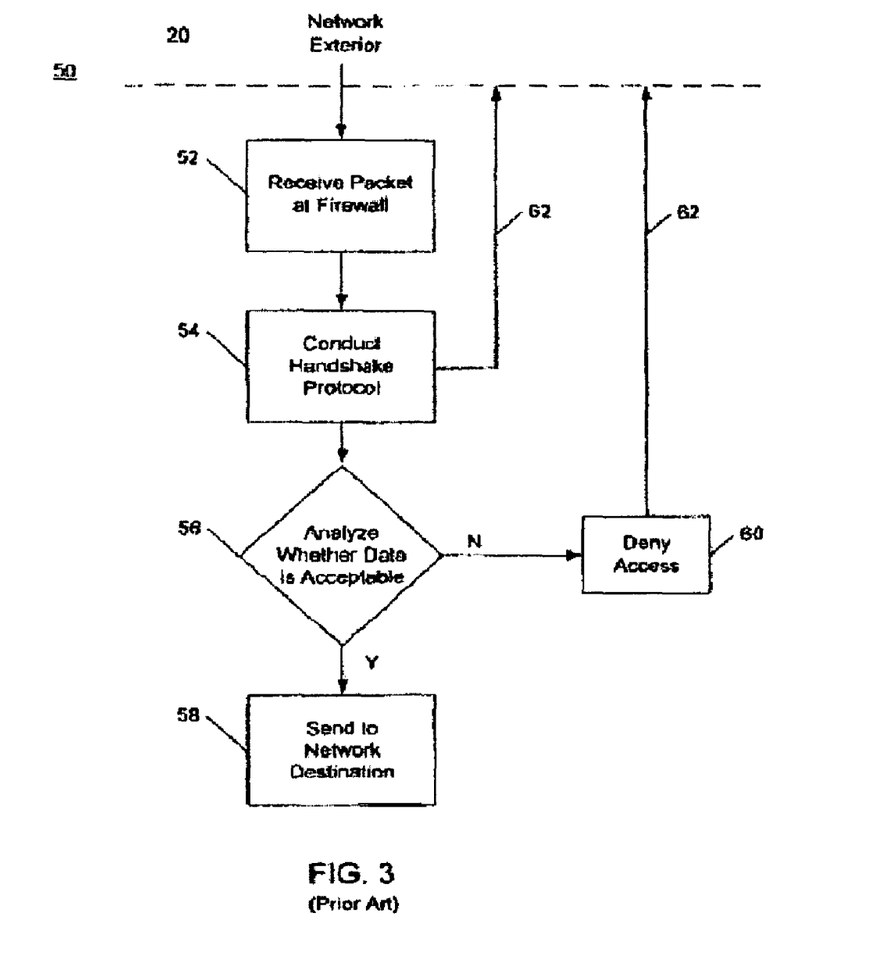
FIG. 3 shows a flow chart of a prior art network firewall protection scheme.

FIG. 3 shows a flow chart 50 of a prior art network firewall protection scheme. First, a packet is received at the firewall 52 from the network exterior 20. The firewall then conducts a handshake protocol 54 after receipt of the packet. The operations of network components are governed by protocols. A protocol is simply an established set of rules or standards that allow computers to connect with one another and exchange information and data with as little error as possible. Protocols may vary widely based different types of computer operating systems and on the different types of communications that are being transmitted. A handshake protocol governs a series of signals acknowledging that the transfer of data can take place between devices ("the handshake"). During the handshake, various changes are made to the packet by the firewall. The address of the firewall is added to the address field to show that the packet has left the firewall. Also, the time-to-live field is decremented by the firewall.

After completing the handshake 54, the packet is analyzed by the firewall to determine whether or not the data is acceptable to forward on to its destination in the network 56. The firewall analyzes the data through a technique called "pattern matching" that is well known hi the art. Additionally, other techniques such as "protocol analysis" could be used as well. If the packet is authorized, it is forwarded on to the network destination by the firewall 58. If the packet is unauthorized, it is denied access to the network 60 and a message such as "resource denied" or "resource restricted" is sent to the sender. The party who sent the data from the exterior network is able to monitor and detect the presence of the firewall after the handshake protocol 62 and after access has been denied 62 due to the changes in the packet at the handshake 62. Once a hacker is able to detect the presence of a firewall, attempts can be made penetrate it and gain access to the network. If a hacker gains knowledge of the presence of a firewall, probes can be made against it. Ultimately, the firewall may be breached or bypassed and unauthorized access to the network can be gained by the hacker.

Figure 4:
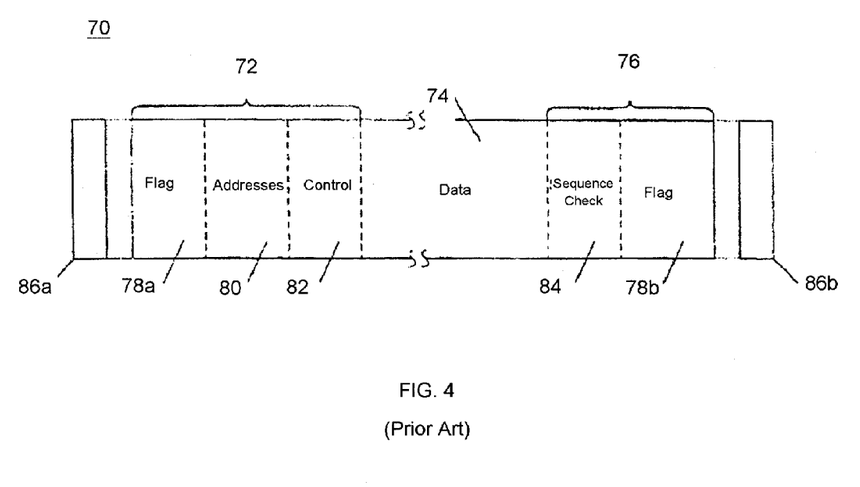
FIG. 4 shows a schematic of a prior art data packet with an Ethernet frame.

In addition to the contents of the data packet described in FIG. 2, a data packet will also contain an "ethernet frame field". The ethernet frame field is used by an ethernet card which is a piece of hardware within the firewall that manages access to the network. FIG. 4 shows a schematic 70 of a prior art data packet with an ethernet frame field. The contents of the data packet are similar to what was previously described in FIG. 2. The data packet includes three segments: a header 72; a body 74; and a trailer 76. The header 72 segment includes: a flag 78a; an address field 80; and a control field 82. The trailer 76 segment includes: a sequence check field 84 and a flag 78b. Additionally, two segments of the ethernet frame field 86a and 86b are included immediately in front of the first flag 78a and immediately following the second flag 78b respectively.

The ethernet frame field 86a and 86b is simply a protocol for processing the packet. Like the data packet, its contents are changed when it leaves the firewall. Specifically, the firewall adds its specific media access controller ("MAC") address to frame field 86a and 86b. The MAC address is a layer of the ISO/OSI (International Organization for Standardization/Open Systems Interconnection) reference model. The ISO/OSI model separates computer to computer communication into seven protocol layers. The ethernet card and the MAC are parts of one of the lower layers of this model and they manage access to the physical network.

Figure 5:
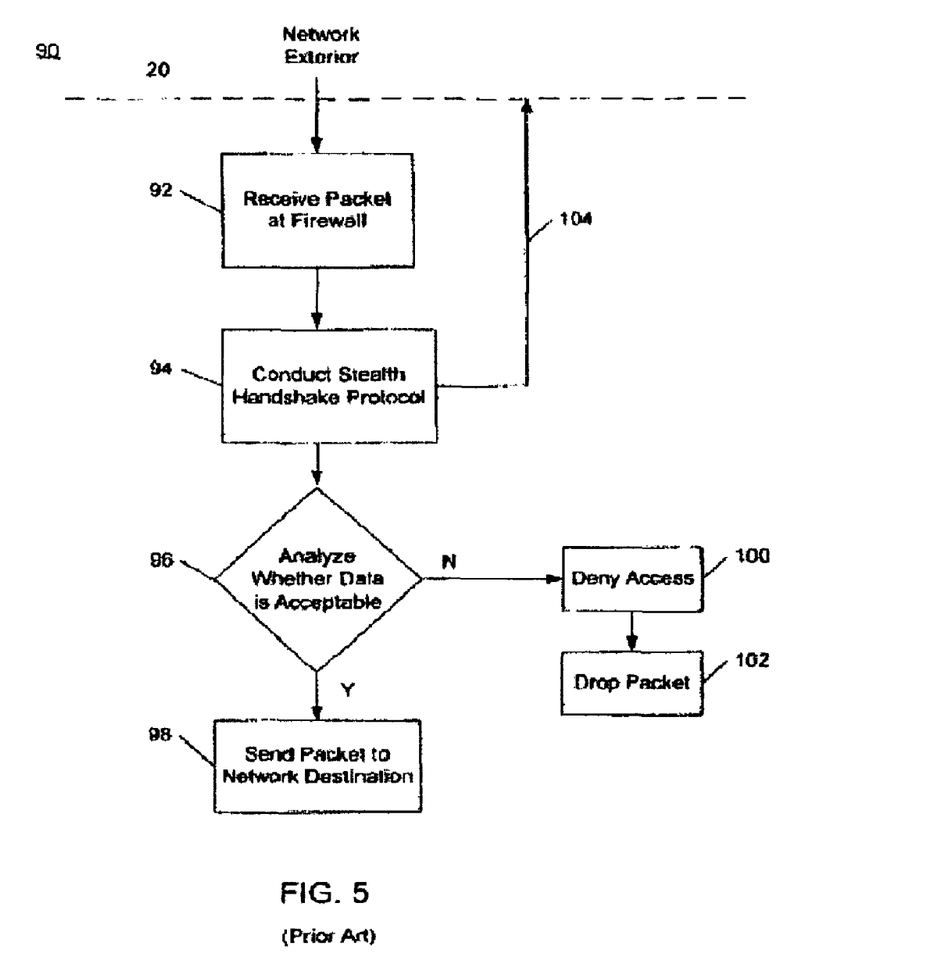
FIG. 5 shows a flow chart of a prior art network stealth firewall protection scheme.

One prior art solution is to make a firewall more difficult to detect (a "stealth firewall"). FIG. 5 shows a flow chart 90 of a prior art network stealth firewall protection scheme. As shown previously in FIG. 3, a packet is first received at the firewall 92 from the network exterior 20. However, a stealth firewall conducts a different type of handshake protocol 94. A stealth firewall does not decrement the time-to-live field of the packet. Consequently, anyone monitoring the status of the packets in the network exterior 20 will not be able to see the stealth firewall due to a change in the value of the time-to-live field. After the stealth handshake 94, the stealth firewall analyzes the packet 96 in a similar manner as previously described for reference number 56 in prior art FIG. 3. If the packet is authorized, it is forwarded on to the network destination by the firewall 98. If the packet is not authorized, it is denied access to the network 100. However, the firewall does not respond to the sender with any type of message indicating a denial of access. Instead, the stealth firewall simply drops the packet 102. The sender is prevented from detecting the stealth firewall by finding any indication of its presence in a decremented time-to-live field or a denial of access message.

However, a stealth firewall may still be detected by the changes it makes to the packet during its handshake protocol 94. Specifically, a stealth firewall leaves its own MAC address in the packet as it conducts the stealth handshake protocol 94. Once the presence of the stealth firewall is detected through the MAC address, a hacker can then begin to probe the firewall and attempt to find a way around it to gain access to the network. In order to prevent attacks by hackers on a firewall, it is necessary to make the firewall undetectable to parties outside the network.

SUMMARY OF THE INVENTION

In some aspects, the invention relates to a method of preventing unauthorized user access to a computer network, comprising: receiving a domain name server resolution request at the computer network from a requesting user; replying to the requesting user with a domain name server resolution and interne protocol address of a target device within the computer network; inspecting the reply to the requesting user with a network security device, where the network security device does not have an assigned internet protocol address; monitoring data traffic to the computer network with the network security device to detect a reply to the internet protocol address of the target device from the requesting user; intercepting the reply to the internet protocol address of the target device from. the requesting user with the network security device; and verifying that the requesting user is authorized to access the computer network with the network security device.

In other aspects, the invention relates to a method of preventing unauthorized user access to a computer network, comprising: step for receiving an access request to the computer network from a requesting user; step for replying to the access request with an internet protocol address within the computer network; step inspecting the reply to the requesting user with a network security device, where the network security device does not have an assigned internet protocol address; step for detecting a reply from the requesting user with the network security device; step for intercepting the reply from the requesting user with the network security device so that it appears to the requesting user that a connection has been established with the internet protocol address within the computer network; and step for verifying that the requesting user is authorized to access the computer network with the network security device.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 6:
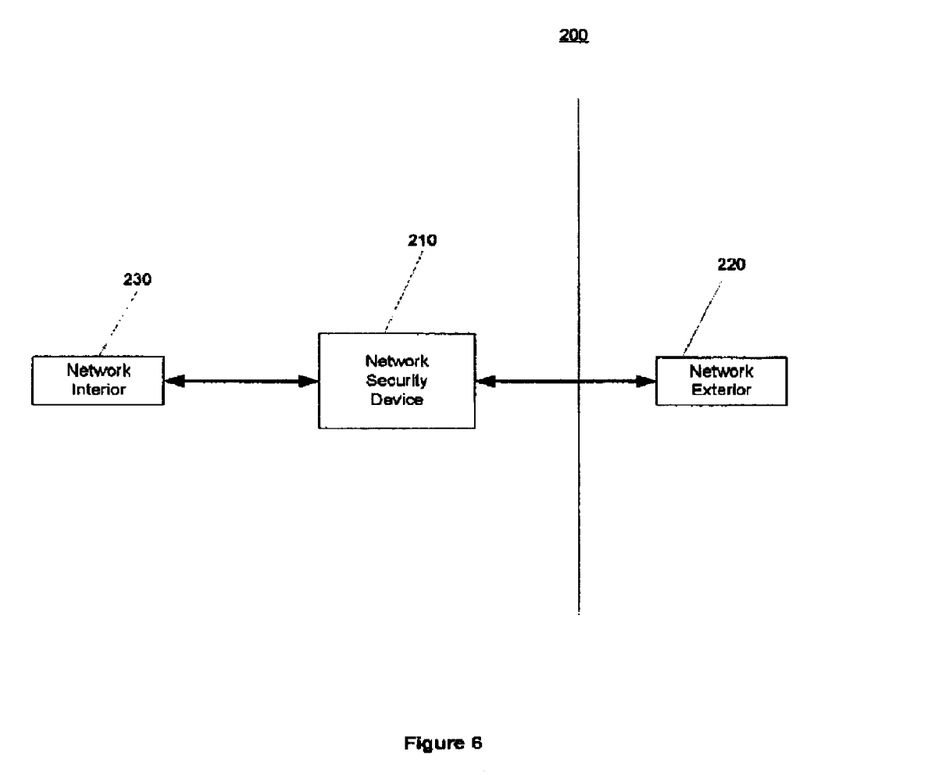
FIG. 6 shows a block diagram of a network security system in accordance with one embodiment of the present invention.

The present invention relates to a method for providing an IP address target when no IP address is assigned to a network security device used to provide security for a network. FIG. 6 shows a block diagram of a network security system 200 in accordance with one example of the present invention. The system 200 provides a network security device 210 that is located along the data path between the network interior 230 and the network exterior 220. In this example, the network security device may be a firewall or other similar device that is used to protect a network interior such as a local area network (LAN) from unauthorized access from the network exterior such as the internet. The network security device 210 is located so that all data traffic between the LAN and the Internet passes through the device.

The present invention provides a method for a network security device 210 to dynamically assign itself a temporary Internet Protocol (IP) address. The network security device 210 can temporarily assign itself a unique IP address so that a connection to the device can be established using standard Internet tools. Upon the end of the session, this IP address is no longer assigned to the device.

This method uses Domain Name Server (DNS) resolution to obtain the IP address from a server. The network security device 210 must be between the Internet and the client/end user attempting to connect to the device. The network security device 210 uses the invented method by looking for the return, or resolution, to the client's DNS resolution request. Upon seeing the resolution, the network security device 210 assigns itself the IP address contained within the DNS resolution and forwards the resolution requests, as defined and intended, to the client. The client's session will attempt to connect to the IP address it received within the DNS resolution and since the network security device 210 assigned itself that same address, said session establishment will resolve between the client and the network security device 210.

One example of this process is that a browser would be opened on a client machine sitting within a LAN. The URL entered into the browser could be related to the name of the device, such as: device.manage.com. Prior to use, a DNS resolution would be setup for device.manage.com. When that URL is entered into a client browser, the DNS resolution request will exit the client machine and head outward into the Internet asking for a DNS server to resolve that URL into a IP address. The network security device 210 will be looking for a return, or DNS resolution, packet coming from the Internet. Upon receiving the DNS resolution packet, the network security device 210 assigns itself the IP address contained within the DNS resolution packet and forwards it to its intended destination (the original client browser). The browser sees this resolution and plugs in the same IP address contained within that DNS resolution packet. Since the browser is seeking to establish a session to that IP address and the network security device 210 has temporarily assigned itself the same IP address, the session will connect to the network security device 210.

In a further example, the network security device 210 simply "grabs" the data traffic to a target EP address in the network interior 230 from a requesting client in the network exterior 220 without having a separate IP address to reveal its presence. With this method, the DNS resolution request goes out from the originator as described previously and the DNS resolution and the target IP address within the network are returned to the requester. As it is returned, the DNS resolution and the target IP address are observed and inspected by the network security device 210. The security device 210 now begins watching for data traffic that is intended for the target IP address that is coming from the requester. If such traffic is detected, it is intercepted by the network security device 210. In such a case, the browser of the requesting client believes that is connected with the device at the target IP address but in fact it is connected to the network security device 210. The client cannot detect the presence of the network security device 210 since it has no separate IP address and therefore remains invisible to the network exterior. The client may not connect with the targeted network device until it is authorized by the network security device 210.

An alternative embodiment of the present invention provides a method for an electronic network security device 210 to reset itself back to a set of factory default parameters without logging into the device, using any type of user interface or any type of hardware reset button. Network security devices generally have a network connector of some type and generally have a status or activity light (LED) located next to the connector. One such example of an embodiment is a RJ45 100BaseT connector.

Upon connecting the network security device 210 to a network, via a cable of appropriate type, network activity, or traffic, is detected by the network controller and a light/LED is usually turned on or blinks due to traffic. The network security device 210 itself is able to detect this attachment as well. By using a sequence of attachments and disconnects of cables to the network security device 210, a pre-defined sequence can be used to tell the device that it should restore its configuration back to the factory defaults.

One embodiment of this is as follows: network security device 210 has two RJ45 100BaseT connectors. The user is told to first connect a live network to the first connector and wait until the LED comes on. Then the other connector is attached to a computer or network, using another cable and user waits until the LED comes on. Once the LED of the second connector comes on, the cable is removed from the first connector and reattached. Upon the LED coming back on, the cable is removed from the second connector and reattached. Upon the LED of the second connector coming on, the cable on the first connector is again removed and reconnected. All of this process must be completed within a pre-defined time period. In this example, the network security device 210 is looking for a 5 part sequence: Connector 1 "ON"; Connector 2 "ON"; Connector 1 "ON"; Connector 2 "ON"; Connector 1 "ON". Once that sequence is seen, within the correct time period, the device resets itself back to factory default settings.

Another alternative embodiment of the present invention relates to a method of handling traffic directed to a nonexistent destination. This embodiment provides a method that allows a network security device 210 to make decisions as to how to handle network traffic based on the packet's intended destination. The destination address of a packet comprises a destination IP address and a port number. The combination of these two fields in an IP packet's header typically tells a network security device 210 how to forward it to its intended destination which consists of a address (e.g., a computer) and a network port (e.g., an assigned number ranging from 1-65536) that a particular application, or "service" is assigned to listen to in order to see the incoming request.

A network security device 210 can choose to handle network packet traffic uniquely based on the destination of the packet going to an invalid address, port or both. This method does not require the network security device 210 to learn or keep track of valid addresses, invalid addresses, or ports of the devices it is protecting. It can determine whether a destination is invalid just prior to completing session establishment. Upon determining the intended destination of a packet is not a valid destination, the network security device 210 can choose to drop the traffic. It can also choose to blacklist the source or origin of the packet. It can also choose to continue providing false information in reply such, that the source device is unable to determine that it has been blacklisted or treated uniquely. This approach creates a silent or stealth blacklist which doesn't alert the attacker that he has been discovered. Furthermore, the invention may include a method for creating a whitelist that would allow the invention to ignore this method. We do this because sometimes a "real web server" might be down temporarily and people wouldn't want to blacklist clients that are correctly trying to connect during that system down time period.

Another alternative embodiment of the present invention relates to a worm propagation detection method. A "worm" is a self-replicating computer program, similar to a computer virus. A virus attaches itself to, and becomes part of, another executable program; however, a worm is self-contained and does not need to be part of another program to propagate itself. They are often designed to exploit the file transmission capabilities found on many computers. A "signature" is a pattern of network traffic that has been determined to be an attack or exploit on a vulnerable computer. A "signature database" is a collection of various signatures used by network firewall-type devices to determine and stop a previously discovered attack that is now occurring.

A worm propagates itself usually with the same replicating method. We can detect this attack, based on the second occurrence of the same identical, or very close, behavior within a "close" timeframe to the first occurrence of that pattern. This does mean the worm was successful once. But then we are able to stop additional attacks that are trying to target other similar machines on the LAN. So, this means that if we see behavior indicating a worm, that is using certain network header fields and occur in a repeating pattern, we can deduce a worm is attacking upon seeing the second identical pattern.

Upon attack detection of a second similar attack, a signature can be created that can be used to stop further attacks. Possible actions include: classifying this as an attack and act accordingly (e.g., drop the traffic and blacklist the offending computer); create a signature in "real time" based on that pattern; and use the signature in the future for detection.

Another alternative embodiment of the present invention relates to a method of detecting or preventing unauthorized access to a wireless access point by having the wireless access point publicly broadcast fake or virtual connections. The invention replies to connection attempts that target the fake access points with real-looking information that makes it further appear to the unauthorized connection that it is successfully connecting. The invention monitors whether any connection is attempted to the fake access points and recording the device's address where the connection attempt began. If that device continues to attempt connections to fake access points, it can be blacklisted. Further traffic from that device address can be dropped. The invention may have an 'anti-recon' capability. When using a wireless access point to also broadcast fake connections, the real access point would also implement a process that embeds various information into a range of fields in the IP header. This would randomize those fields in such a way as to harden them against attackers that are "reconing" a network for valid IP addresses and open ports.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of preventing unauthorized user access to a computer network, comprising:
    receiving a domain name server resolution request at the computer network from a requesting user;
    replying to the requesting user with a domain name server resolution and internet protocol address of a target device within the computer network;
    inspecting the reply to the requesting user with a network security device, where the network security device does not have an assigned internet protocol address;
    monitoring data traffic to the computer network with the network security device to detect a reply to the internet protocol address of the target device from the requesting user;
    intercepting the reply to the internet protocol address of the target device from the requesting user with the network security device wherein the reply to the internet protocol address of the target device from the requesting user is received by the network security device; and
    verifying that the requesting user is authorized to access the computer network with the network security device.

2. The method of claim 1, where the network security device uses the internet protocol address of the target device when intercepting the reply from the requesting user in order to remain undetected by the requesting user.

3. The method of claim 1, where the network security device comprises a firewall.

4. The method of claim 1, where the computer network is in a local area network.

5. A method of preventing unauthorized user access to a computer network, comprising:
    step for receiving an access request to a destination on the computer network from a requesting user;
    step for replying to the access request with an internet protocol address of the destination within the computer network;
    step for inspecting the reply to the requesting user with a network security device, where the network security device does not have an assigned internet protocol address;
    step for storing the internet protocol address at the network security device;
    step for sending the reply to the requesting user;
    step for detecting a reply from the requesting user with the network security device, with the reply from the requesting user specifying the internet protocol address as its destination;
    step for intercepting the reply from the requesting user with the network security device without transmitting the reply from the requesting user to the destination;
    step for sending a reply to the reply from the requesting user so that it appears to the requesting user that a connection has been established with the internet protocol address within the computer network; and
    step for verifying that the requesting user is authorized to access the computer network with the network security device.

6. The method of claim 5, where the network security device temporarily assign the internet protocol address of the destination within the computer network to itself, upon sending the reply to the requesting user with the internet protocol address.

7. The method of claim 6, where the network security device releases the temporarily assigned internet protocol address upon the end of the session.

* * * * *